(12) United States Patent
Wu et al.

(10) Patent No.: US 8,259,350 B2
(45) Date of Patent: Sep. 4, 2012

(54) JOB-SPECIFIC PRINT DEFECT MANAGEMENT

(75) Inventors: Wencheng Wu, Webster, NY (US); Edul N. Dalal, Webster, NY (US); D. Rene Rasmussen, Pittsford, NY (US)

(73) Assignee: Xerox Corporation, Norwalk, CT (US)

( * ) Notice: Subject to any disclaimer, the term of this patent is extended or adjusted under 35 U.S.C. 154(b) by 812 days.

(21) Appl. No.: 12/352,841

(22) Filed: Jan. 13, 2009

(65) Prior Publication Data

US 2010/0177330 A1 Jul. 15, 2010

(51) Int. Cl.
*G06F 15/00* (2006.01)
*G06K 9/40* (2006.01)

(52) U.S. Cl. ........ 358/1.9; 358/1.1; 358/1.12; 358/1.13; 358/1.15; 358/3.06; 358/3.2; 358/3.23; 358/3.26; 358/504; 358/518; 358/523; 358/296; 358/406; 347/9; 347/14; 347/30; 347/35; 347/37; 347/43; 347/120; 347/251; 382/112; 382/113; 382/140; 382/135; 382/136; 382/137; 382/138; 382/139; 382/149; 382/167; 382/195; 382/254; 382/260; 382/275

(58) Field of Classification Search ........................ None
See application file for complete search history.

(56) References Cited

U.S. PATENT DOCUMENTS

| | | | | |
|---|---|---|---|---|
| 5,625,757 | A | * | 4/1997 | Kageyama et al. .......... 358/1.14 |
| 6,377,758 | B1 | | 4/2002 | OuYang et al. |
| 2006/0274375 | A1 | * | 12/2006 | Robinson .................... 358/3.06 |
| 2007/0097440 | A1 | * | 5/2007 | Majewicz .................... 358/3.06 |
| 2007/0195351 | A1 | * | 8/2007 | Mashtare et al. ............ 358/1.13 |
| 2008/0137914 | A1 | | 6/2008 | Minhas |

OTHER PUBLICATIONS

U.S. Appl. No. 12/138,846, filed Jun. 13, 2008 in the name of Roulland et al.

* cited by examiner

*Primary Examiner* — Steven Kau
(74) *Attorney, Agent, or Firm* — Oliff & Berridge, PLC

(57) ABSTRACT

A print defect management device that supports job-specific print defect management automatically assesses print job pages to determine the severity of image quality defects likely to occur on one or more selected printers. Views of identified troubled pages may be rendered to include approximations of color and image quality defects based on the original page image data, and each printer's color rendition data and defect data, thereby allowing troubled pages for one or more selected printers to be viewed prior to printing. Suggested changes may be automatically or manually applied. Once satisfied with the image quality of print job pages rendered for a specific printer, a user may submit the print job to the same printer, thereby assuring that the user's image quality expectations are met in the printed product. The device may support job-specific print defect management with both local and/or remote printers via LAN, WAN and/or Internet based connectivity.

19 Claims, 12 Drawing Sheets

JOB-SPECIFIC PRINT DEFECT MANAGEMENT

BACKGROUND

This invention generally relates to systems and methods for detecting and correcting image quality defects in one or more pages of a print job, prior to printing the print job on a selected printer.

Detection, and the subsequent correction, of image quality defects ensures the production of quality printed images. There are various existing approaches for detecting image quality defects in printed images. For example, U.S. Pat. No. 6,377,758 by OuYang, et al., entitled METHOD AND SYSTEM FOR ANALYZING IMAGING PROBLEMS filed Apr. 23, 2002, describes a method and a system for analyzing image quality by printing an image, scanning the printed image and comparing the scanned image and the original image on a pixel by pixel basis to detect image quality defects.

Further, systems have been described that allow image quality defects to be shown in a rendered page image prior to printing the page image on a printer that would result in such image quality defects in the printed output. For example, U.S. Patent Application Publication No. 20080137914 by Rajinderjeet S. Minhas, entitled PRINTER JOB VISUALIZATION filed Dec. 7, 2006, describes a system for visualizing a page image that includes a page image simulator which applies a print defect model associated with a specific printer to page image data to generate a simulated page image of the page as it would likely appear if the page image were printed on the specific printer. The system also includes a display in communication with the page image simulator for displaying the simulated page image.

The above approaches can provide substantial improvements in image quality and image consistency; however, each has its respective deficiencies. For example, U.S. Pat. No. 6,377,758 requires that a user print and scan an image before image quality defects specific to the printer for the specific image may be detected. Such an approach is not feasible for performing image quality defect management of large print jobs and moreover requires physical access to the printer. For example, printing an image before image quality defects specific to the printer for the specific image can be detected, rather than allowing the user to assess the image quality before printing the image, wastes paper as well as other valuable printer resources for those printed pages that do not meet the user's image quality requirements. U.S. Patent Application Publication No. 20080137914 allows a user to view rendered soft images that contain image quality defects specific to a printer for a specific image, without printing. However, the user is required to manually view each, i.e., every, image in a print job and make a manual decision regarding whether the image quality is acceptable. An approach that requires such user interaction for each printed image is also not feasible for performing image quality defect management of large print jobs.

SUMMARY

A print defect management device that supports job-specific print defect management is described.

The print defect management device allows pages within a print job to be automatically assessed to determine whether image quality defects, e.g., mottle, graininess, banding, streaking, etc., are likely to be visible or objectionable to users if the print job is printed on a selected printer, and may automatically determine the severity of likely image quality defects on the respective pages of the print job. By automatically identifying pages with image quality troubles, the described print defect management device saves a user the effort of visually soft-proofing every page in the print job and allows the user to focus on only those pages expected to include image defects that are sufficiently severe to be observed with and/or objectionable to the human eye.

The approach may allow a user to generate rendered views of identified troubled pages within a print job. A rendered view may be based on the original page image data, the color rendition data of a selected printer, and defect data associated with a selected printer, thereby allowing the user to view a troubled page as it would be printed on the selected printer, including color and image quality defects that would be introduced to the printed page by the selected printer.

The print defect management device may circle, or otherwise identify, areas within the rendered images affected by printer image quality defects. The print defect management device may present the user with suggested changes to one or more pages within the print job to better match the respective pages to the printer's color rendition data and the printer's known image quality defects, thereby eliminating or reducing the severity of identified image quality defects in the printed pages. If accepted by the user, the suggested changes maybe automatically applied to modify the respective page images of the print job.

The approach may also be used to manually correct identified image quality defects within troubled page images and to view a re-rendered version of the modified page image. If the user determines that the image quality for the automatically identified troubled pages is acceptable, the print defect management device may allow the user to submit the print job to the selected printer for which the rendered images were approved by the user, thereby assuring that the user's image quality expectations are met by the final printed product.

The print defect management device may be configured to communicate with local printers associated with a single print facility, e.g., via a local area network (LAN), or may be configured to communicate with printers at multiple geographically dispersed print facilities, each with one or more printers, via a wide area network (WAN) or Internet connection. Allowing the print defect management device to perform job-specific print defect analysis over a greater number of printers increases the likelihood that a printer may be located that is capable of printing the print job pages with a reduced number of visible print quality defects and greatly increases a user's control of the print quality that may be achieved using remote printing services. The printers may be of different types or models. To select the most "suitable" printer from a plurality of available printers, image quality may not be the only criterion. A cost function may be defined in terms of image quality together with productivity, cost, availability, and/or other factors. Default weights may be provided for these factors in the cost function, and the user may be allowed to changes these weights as needed. The most suitable printer will then be the one that minimizes the cost function. Image quality may be the only factor in the cost function which is improved by print defect management, so it may not be necessary to apply a cost function if only a single printer is being considered.

BRIEF DESCRIPTION OF THE DRAWINGS

Example embodiments will be described with reference to the accompanying drawings, wherein like numerals represent like parts, and in which.

DETAILED DESCRIPTION OF EMBODIMENTS

Figure 1:
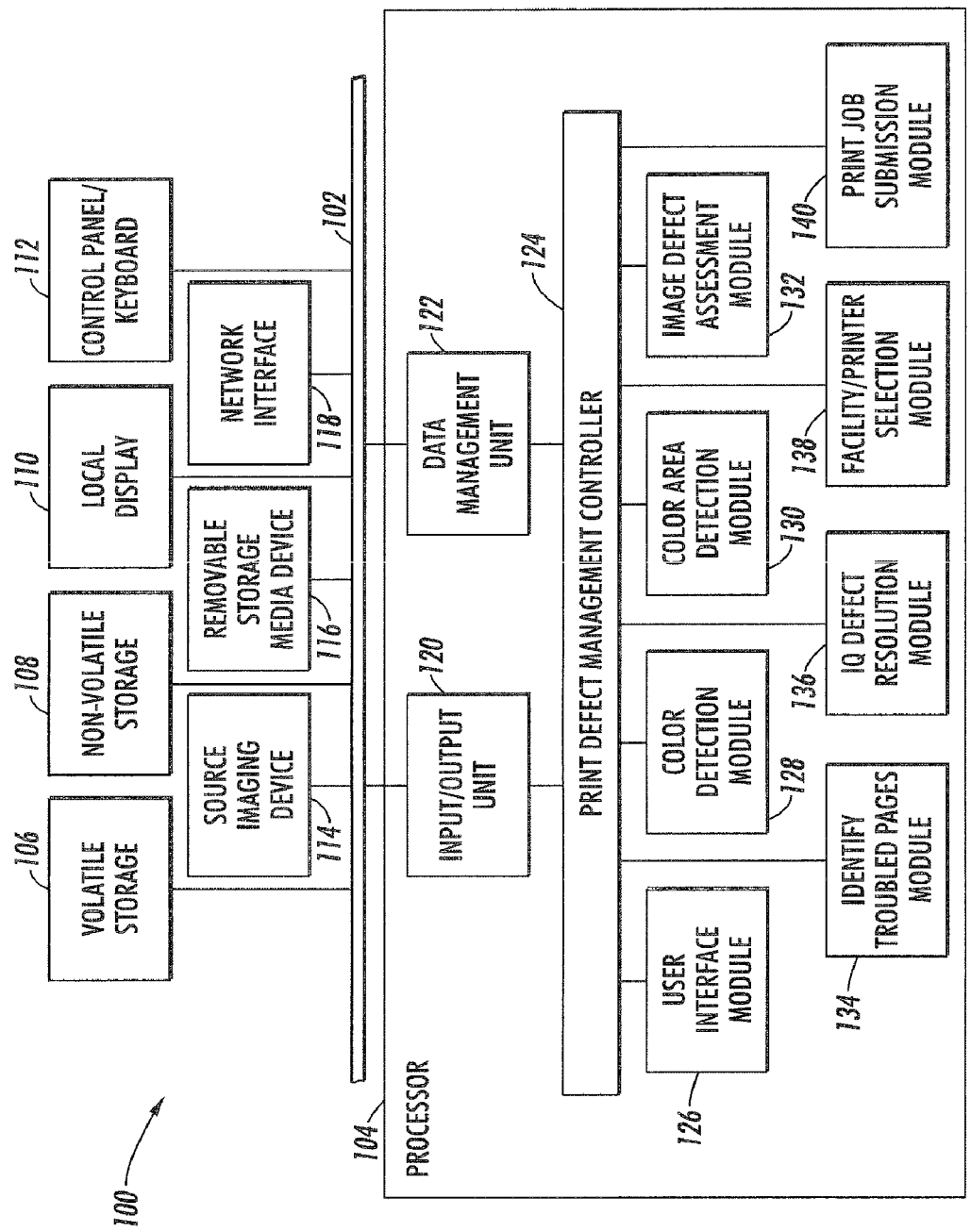
FIG. 1 is a system level block diagram of an example print defect management device that supports job-specific print defect management.

FIG. 1 is a system level block diagram of an example print defect management device that supports job-specific print defect management. As shown in FIG. 1, a print defect management device 100 that supports job-specific print defect management may include a computer system data bus 102 that allows a processor 104 to communicate with, and exchange information with, hardware components of the print defect management device such as: a volatile memory storage 106, which allows the processor 104 to store program instructions in local memory for execution and to store and maintain temporary data necessary for execution of the stored program instructions; a non-volatile storage 108, such as a hard-drive and/or firmware storage, which allows processor 104 to access and retrieve and/or store bodies of data and program instructions for later use/execution by the processor; a local display 110, which may support a visual interface with a print job manager, or user, who is responsible for assuring a hardcopy printout of a print job meets the user's image quality needs; a control panel/keyboard 112, and/or a cursor control device that allow the processor to receive user instructions and/or information and/or feedback; a network interface 118 which allows processor 104 to communicate with and exchange information with network connected processing devices, e.g., such as electronic data storage devices, local and/or remote print facility printers and/or other network devices, thereby allowing print defect management device 100 to receive and store electronic data for pages in a print job, communicate with print facilities and/or printers to obtain printer color rendition data and printer defect data, and/or to submit a print job to a selected print facility printer, a source imaging device 114, which may be used to scan paper images, thereby allowing print defect management device 100 to locally generate and store electronic source image data for pages within a print job based on a hardcopy original; and a removable storage device that may be used to receive original print job images from and/or to store modified print job images to a locally inserted removable storage media.

As further shown in FIG. 1, processor 104 may include internal components that allow the processor to communicate with the above-described hardware components to send and to receive data and instructions over system bus 102. Such components may include: an input/output unit 120 that manages communication exchanges between processes executed by the processor and the system bus 102; and a data management unit 122, which allows the processor to maintain a local set of control parameters such as counters, pointers, and segments of executable program instructions for execution.

For example, when provided with executable instructions, processor 104 may, in accordance with instructions/commands received from a user via control panel/keyboard 112 or via a network connection via network interface 118, retrieve and initiate control parameters/pointers for the execution of program instructions related to print job-specific print defect management. For example, at startup, processor 104 may retrieve and load program instructions from non-volatile storage 108 into volatile memory 106 for execution and may maintain control parameters in data management unit 122 for use in controlling the simultaneous and/or sequential execution of the program instructions retrieved for execution.

For example, as shown in FIG. 1, processor 104 may establish, based on stored program instructions retrieved for execution from non-volatile storage 108: a user interface module 126 that supports a user interface between the print defect management device and a user via local display 110 and control panel/keyboard 112, e.g., to receive user commands and instructions for managing job-specific print defects; a print defect management controller 124 that coordinates the execution of job-specific print defect management tasks in accordance with instructions received from the user via the user interface; a color detection module 128 that may detect a set of colors within a page image; a color area detection module 130 that may identify colors, e.g., within the set of colors identified by color detection module 128, that cover sufficient contiguous area of the page image that image quality defects may be visible and/or objectionable to the human eye; an image defect assessment module 132 that may generate an estimate of the expected severity of image quality defects likely to occur within individual images of a set of images, if printed on a selected printer; an identify troubled pages module 134 that identifies pages with significant image quality defects based on the image assessments generated by image defect assessment module 132; an image quality defect resolution module 136 that may be used to assist a user in correcting identified image quality defects within troubled images; a facility/printer selection module 138 that may be used to identify print facilities/printers to which a print defect management device 100 may establish connectivity via a LAN, WAN or Internet connection and which are available to print the current print job; and a print job submission module 140 that allows a user to submit a print job, or a corrected print job, to a selected print facility printer.

In operation, each of the above-described modules/controllers executed by processor 104 may maintain a workflow state machine, and/or control parameters that allow each module to perform its assigned task. For example, print defect management controller 124 may maintain a work-flow, state machine, and/or control parameters that allows print defect management controller 124 to coordinate the functions performed by other modules executed by processor 104 to perform job-specific print defect management in accordance with instruction received via the user interface from a user.

For example, print defect management controller 124 may contain a set of control parameters that allows it to initiate the performance of specific actions by each of the other modules executed by processor 104. Each module executing an assigned task may provide print defect management controller 124 with status updates, e.g., indicating the completion of an assigned task, thereby allowing print defect management controller 124 to orchestrate activities performed by the respective modules/controllers in series and/or in parallel to expedite the smooth and efficient execution of an interactive job-specific print defect management session with a user.

User interface module 126 may generate and present to a user via, for example, local display 110, displays that allow the user to interact with and control a job-specific print defect management session. For example, at the start of a job-specific print defect management session, a user may be presented with a display that allows the user to identify a location of electronic files, or print images, associated with the print job. Further, the user may be requested to select, e.g., with facility/printer selection module 138, one or more print facilities and one or more printers at the respective selected print facilities at which the user is considering printing the print job. Once such information is provided, print defect management controller 124, color detection module 128, color area detection module 130 and image defect assessment module 132 may be instructed by print defect management controller 124 to retrieve color rendition data and print defect data related to the selected printers, and to process the data, as described below, to produce an assessment of the image quality defects for each page in the print job for each selected printer.

In one example embodiment, once processing by image defect assessment module 132 is completed, the user may be presented with a prioritized list of the selected printers in which the most suitable printer is presented first and the least suitable printer is presented last. Suitability may be determined via a cost function which includes image quality, as described earlier. The user may use image quality defect resolution module 136 to view rendered images of the print job and to attempt to eliminate, or improve, the image quality defects identified in the rendered page images. Once the user is satisfied that the image quality produced by a selected printer is adequate, the user may submit the print to a selected printer via print job submission module 140.

Color detection module 128 may, for each page in a print job, identify colors included in the image. For example, in one example embodiment, color detection module 128 may divide a page image into blocks of pixels, e.g., N×M when M=N=3, and may calculate an average pixel color based on the actual pixel colors in the block, and may calculate a standard deviation of the pixel colors in the block. In one example embodiment, color detection module 128 may save the average color calculated for blocks with a standard deviation value less than a predetermined value. Once all the blocks have been processed, a k-means algorithm, or similar approach, may be used to cluster the stored average color values to identify a predetermined number, K, of colors in the image. An example process by which color detection module 128 may analyze a page image to identify K colors in the page image is described below with respect to FIG. 5.

Color area detection module 130 may retrieve the list of K colors identified by color detection module 128 and may analyze each page with respect to each of the K colors to determine which of the K colors cover sufficient contiguous area of the page image that image quality defects may be visible and/or objectionable to the human eye. An example process by which color area detection module 130 may analyze a page image with respect to the respective K significant colors is described below with respect to FIG. 6 and FIG. 7.

Image defect assessment module 132 may assess each page in a print job with respect to image quality defects for which information existed in each selected printer's image defect data, and may produce an area-weighted image quality defect sum for each image quality defect, for each page of the print job. An example process by which image defect assessment module 132 may produce and store an area-weighted image quality defect sum for each defect in each page of the print job is described below with respect to FIG. 8.

Identify troubled pages module 134 may identify potential troubled page images within a print job, based on the stored results of the image quality assessment process performed by image defect assessment module 132 and predetermined threshold limits set for each type of image quality defect. This information may be used to produce a prioritized list of print facility printers capable of printing the current print job, the printers included in the list may be sorted based on the number and severity of image quality defects each printer is expected to produce. An example process by which identify troubled pages module 134 may identify troubled images in a print job for each of a plurality of selected printers in one or more print facilities is described below with respect to FIG. 9.

Image quality defect resolution module 136 may be used to view rendered images of troubled pages within a print job, may propose suggested solutions to the user to correct/improve the identified image defects, may allow a user to edit the respective troubled pages to apply a suggested solution and/or to apply other user edits to a page image, and may allow a user to invoke print job submission module 140 to submit a print job to a selected printer to produce a hardcopy printout. Additional details related to image quality defect resolution module 136 are described below with respect to FIG. 2. An example process by which image quality defect resolution module 136 may allow a user to review, edit and submit a print job to a printer determined by the user to meet the users image quality expectations is described below with respect to FIG. 10.

Facility/printer selection module 138 allows a user to select one or more printers from one or more print facilities, so that the user may use print defect management device 100 to determine which printer the print job should be submitted to in order to assure that the user's image quality expectation will be met. As described in greater detail with respect to FIG. 3, below, print defect management device 100 may be configured to operate as part of a local print facility to assist a user in determining which printer(s), among multiple printers in the facility are capable of meeting the users image quality expectations. However, as described in greater detail with respect to FIG. 4, below, print defect management device 100 may also be configured to allow access to a plurality of print facilities to assist a user in determining which printer(s), among all the printers in the respective print facilities, are capable of meeting the users image quality expectations. Facility/printer selection module 138 may be used to identify print facilities/printers to which a print defect management device 100 may establish connectivity with via a LAN, WAN or Internet connection and which is available to print the current print job. For example, facility/printer selection module 138 may be invoked by print defect management controller 124 at the beginning of a job-specific print defect management session to identify facilities/printers for which image defect analysis may be performed. If the user does not select a subset of printers from the list of available print facilities/printers available, the print defect management controller 124 may be configured to select one or more of the printers automatically, e.g., based on one or more predetermined default printers. Facility/printer selection module 138 may be invoked by a user at any time during a job-specific print defect management session to expand or to contract the number of facilities/printers for which image defect analysis is performed.

Print job submission module 140 may allows a user to submit the current print job to one or more print facility printers. For example, by default, the print job submission module may be configured to submit a job to the print facility printer identified by identify troubled pages module 134 as capable of printing print job with the fewest number of image quality defects. However, the user may override the default print manually, e.g., after determining that another available printer is capable of meeting the user's image quality expectations. Once a submitted print job has been completed, the print job submission module 140 may alert the user that the pint job is available for pickup or delivery.

Figure 2:
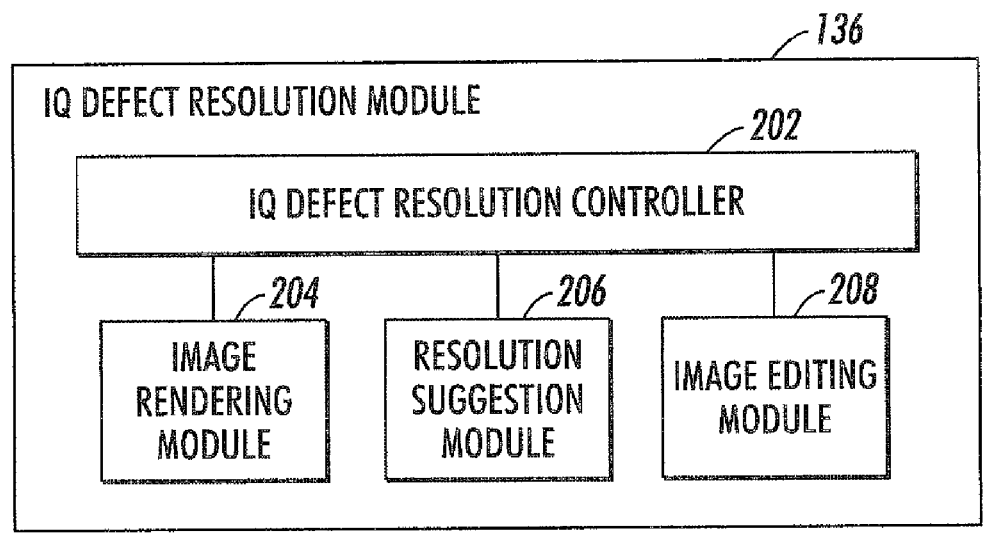
FIG. 2 is a module level block diagram of an image quality defect resolution module presented in FIG. 1.

FIG. 2 is a module level block diagram of an example image quality defect resolution module 136 described above with respect to FIG. 1. As shown in FIG. 2, image quality defect resolution module 136 may include an image quality defect resolution controller 202, an image rendering module 204, a resolution suggestion module 206, and an image editing module 208.

Image quality defect resolution controller 202 may control overall operation of image quality defect resolution module 136 by communicating with print defect management controller 124, and/or other modules within print defect management device 100, to receive information/instructions required, for image quality defect resolution module 136 to support a job-specific image quality defect resolution session with a user.

Image rendering module 204 may generate and display to a user via the user interface a rendered version of a page within a print job that has been identified by image defect assessment module 132 as likely to have one or more image quality defects of sufficient severity to be detected by and/or objectionable to the human eye. The rendered image generated by image rendering module 204 may be based on color rendition data and printer defect data associated with a selected print facility printer. The rendered image may allow a user to view the page as the page would likely appear, if printed on the selected printer. The rendered image may indicate the troubled areas within the page with an indicator, such as a pointer or circle, so that the user may decide whether the printed page, with defects, meets expected image quality expectations.

Resolution suggestion module 206 may present a user with suggestions for improving or eliminating the image quality defects identified in a rendered image. For example, by clicking on an area of a rendered image identified by image rendering module 204 as including defects, a user may be presented with a list of alternatives for improving or eliminating the image quality defect. For example, if the defect is due to the selected printer's color rendition data being unable to match a color included on the page, resolution suggestion module 206 may suggest one or more alternative colors. For example, if the image quality defect is mottled in the selected color, resolution suggestion module 206 may suggest one or more alternative colors that is close to the original color, but that, according to the printer defect data, would not suffer from such a severe level of mottle.

Image editing module 208 may allow a user to apply one or more changes suggested by resolution suggestion module 206 and/or allow a user to manually apply other changes, as desired, that are compatible with the currently selected printer. For example, if a user wishes to apply a change suggested by resolution suggestion module 206, image editing module 208 may apply the suggested change to the image in response to the user indicating acceptance, via the user interface, of the suggested change. For example, assuming that the user decides to change a color, the image editing module 208 may only present colors supported by the currently selected printer's color rendition data. Once a change is applied, image editing module 208 may, via image quality defect resolution controller 202, instruct image rendering module 204 to re-render the image as the modified image would appear on the currently selected printer.

Figure 3:
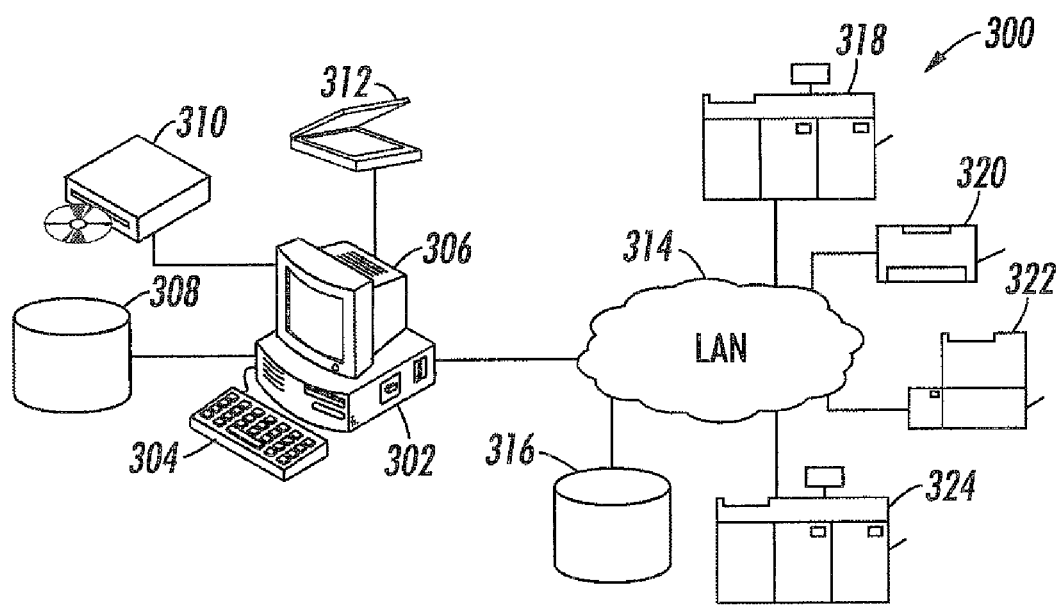
FIG. 3 is a network diagram of an example print facility local area network that provides connectivity between an example print defect management device and printers within the print facility.

FIG. 3 is a network diagram of an example print facility local area network that provides connectivity between an example print defect management processor and printers within the print facility. As shown in FIG. 3, an example print defect management device 302, with a display 306, keyboard and mouse 304, local non-volatile storage media device 308, removable storage media device 310 and scanner 312 may be connected via a local area network to, for example, a network storage media device 316, a first printer 318, a second printer 320, a third printer 322 and a fourth printer 324. During a job-specific print defect management session, print defect management device 302 may retrieve a print job, e.g., from removable storage media device 310 or via the network from network storage media device 316, and may identify those printers that are available, via the network, for printing a current print job, e.g., via its facility/printer selection module 138.

Once a set of printers is selected, print defect management device 302 may retrieve printer color rendition data and printer defect data for each printer based on, for example, direct network communication with the selected printers and/or based on information retrieved from, for example, network storage media device 316 or other network accessible device that maintains such information, for each of the selected printers. Print defect management device 302 may then process the pages of the print job, e.g., with color detection module 128, color area detection module 130, image defect assessment module 132 and identify troubled pages module 134, to identify a list of the selected printers e.g., ordered by the number/severity of image quality defects each printer is expected to produce. The user may chose to review, and optionally edit, rendered images of identified troubled pages associated with one or more of the printers and may submit the print job to a printer that the user has determined meets the user's print quality expectations, e.g., via print job submission module 140.

Figure 4:
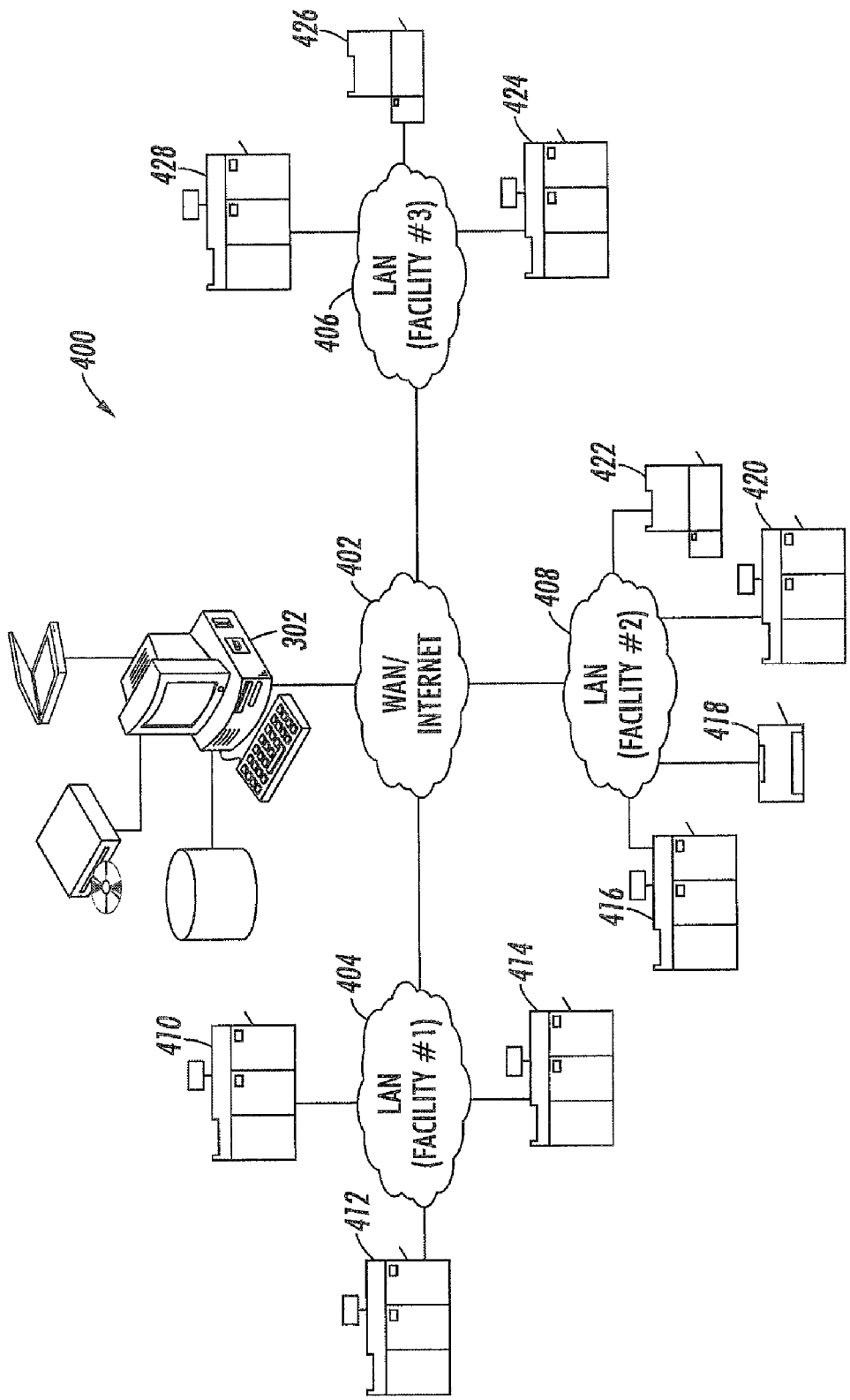
FIG. 4 is a network diagram showing an example print defect management device capable of communicating with, and performing job-specific print defect management with, selected individual printers in multiple print facilities via an Internet/wide area network/local area network connection.

FIG. 4 is a network diagram showing an example print defect management device capable of communicating with individual printers at several print facilities via an Internet, WAN and/or LAN connection. As shown in FIG. 4, print defect management device 302 may connect via WAN/Internet 402 to each of three print facility LANS, namely, a first print facility LAN 404, a second print facility LAN 406, and a third print facility LAN 408 to discover and retrieve information related to available printers associated with each of the respective print facilities. For example, print defect management device 302 may retrieve color rendition data and print defect data pertaining to printer 410, printer 412 and printer 414 via LAN 404; may retrieve color rendition data and print defect data pertaining to printer 416, printer 418, printer 420 and printer 422 via LAN 408; and may retrieve color rendition data and print defect data pertaining to printer 424, printer 426 and printer 428 via LAN 406. Once such data has been obtained, e.g., based on direct communication with each of the respective printers and/or communication with a storage device connected to the respective LANs that maintains such information for printers connected to the respective LANS, print defect management device 302 may process the pages of the print job, e.g., with color detection module 128, color area detection module 130, image defect assessment module 132 and identify troubled pages module 136, to identify a list of the selected printers e.g., ordered by the number/severity of image quality defects each printer is expected to produce based on the retrieved color rendition data and print defect data. The user may chose to review, and optionally edit, rendered images of identified troubled pages associated with one or more of the printer and may submit the print job to a LAN/WAN/Internet printer that the user determines meets the user's print quality expectations.

Figure 5:
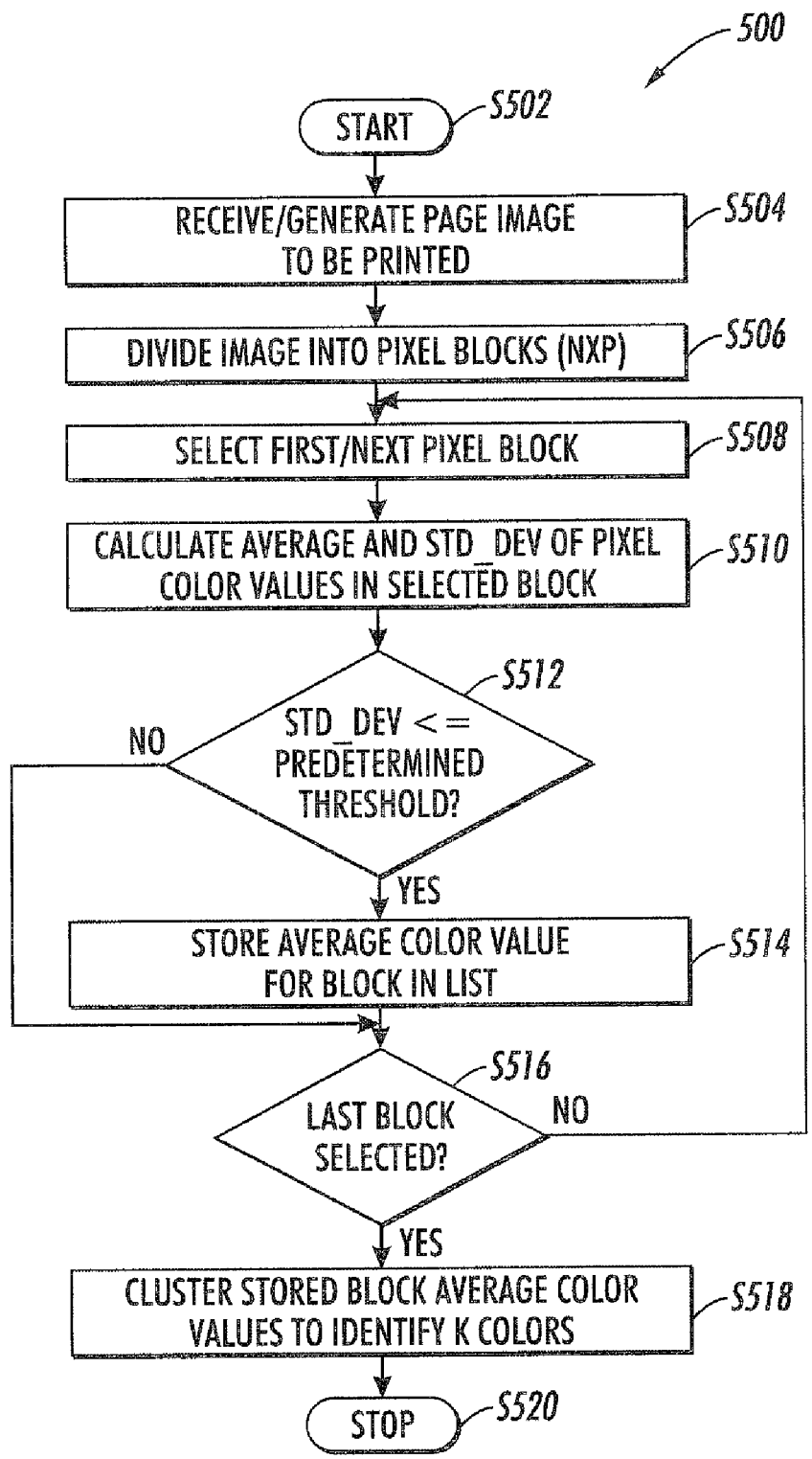
FIG. 5 is a flow diagram representing an example process by which an example color detection module of the example print defect management device described with respect to FIG. 1, detects a set of colors within a page image.

FIG. 5 is a flow diagram representing an example process 500 by which an example color detection module 128 of the example print defect management processor 100 described with respect to FIG. 1, may detect a set of colors within a page image. The process shown in FIG. 5 may be repeated for each page of a print job regardless of the number of printers to be assessed in association with a current job-specific print defect management session and the list of identified K colors generated for each page may be stored for future use. As shown in FIG. 5, the described process begins at step S502 and proceeds to step S504.

In step S504, the color detection module 128 may receive page image data for a page to be printed, and operation of the process continues to step S506.

In step S506, color detection module 128 may divide the page image into N×P blocks, e.g., where N=P=3 pixels, and operation of the process continues to step S508.

In step S508, color detection module 128 may select a first/next pixel block, and operation of the process continues to step S510.

In step S510, color detection module 128 may calculate an average color and standard deviation of the pixels in the selected block, and operation of the process continues to step S512.

If, in step S512, the standard deviation of the color of the pixels in the selected block is less than or equal to a predetermined or adaptive threshold, operation of the process continues to step S514, otherwise, operation of the process continues to step S516.

In step S514, the average color value calculated for the selected block is stored, and operation of the process continues to step S516.

If, in step S516, the last block of pixels in the image has been selected, operation of the process continues to step S518, otherwise, operation of the process continues to step S508.

In step S518, the list of stored average color values, produced as a result of saving individual average color value at step S514, above, may be processed using clustering techniques to identify, e.g., using a k-means algorithm to find the centers of natural clusters in the data by reducing total intra-cluster variance below a predetermined or adaptive threshold, a set of K colors included in the page image, and operation of the process continues to step S520 and terminates.

Figure 6:
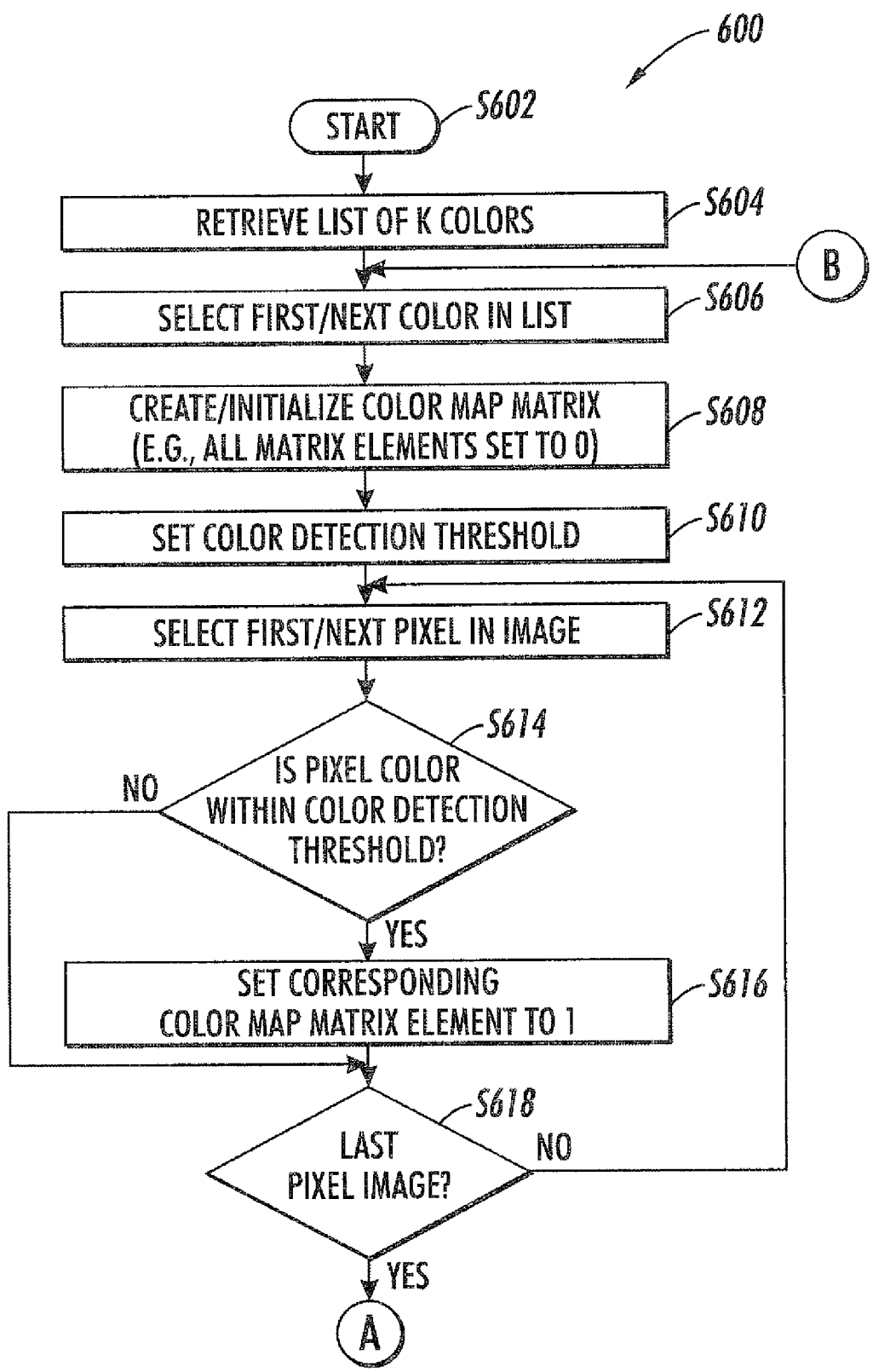
FIG. 6 and FIG. 7 are a flow diagram representing an example process by which an example color area detection module of the example print defect management device described with respect to FIG. 1, may identify colors, e.g., within the set of colors identified using the example process described with respect to FIG. 5, that cover sufficient contiguous area of the page image that image quality defects may be visible and/or objectionable to the human eye.
Figure 7:
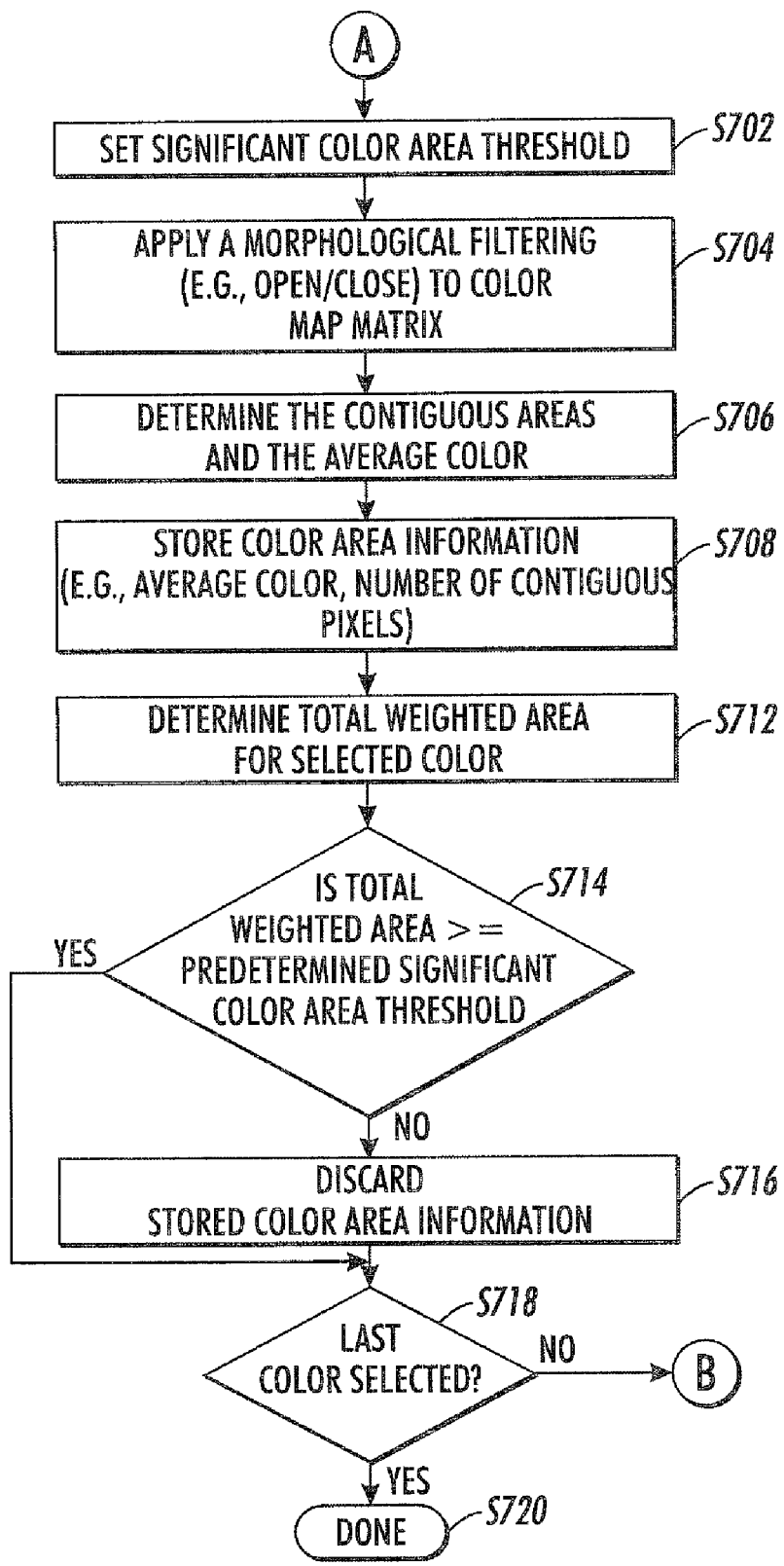

FIG. 6 and FIG. 7 are a flow diagram representing an example process 600 by which an example color area detection module 130 of the example print defect management processor 100 described with respect to FIG. 1, may identify colors, e.g., within the set of K colors identified using the example process described above with respect to FIG. 5, that cover sufficient contiguous area of the page image that image quality defects may be visible and/or objectionable to the human eye. The process shown in FIG. 6 and FIG. 7 may be repeated for each page of a print job regardless of the number of printers to be assessed in association with a current job-specific print defect management session and the list of colors with significant color areas may be stored for later use. As shown in FIG. 6, the described process begins at step S602 and proceeds to step S604.

In step S604, the list of K colors generated for the page by, for example, color detection module 128 using the process described above with respect to FIG. 5, is retrieved by color area detection module 130 from storage, and operation of the process continues to step S606.

In step S606, color area detection module 130 selects a first color from the list, and operation of the process continues to step S608.

In step S608, color area detection module 130 may create a color map matrix, e.g., containing a binary element for each pixel in the current page image, and may initialize all elements in the color map matrix, e.g., to 0, and operation of the process continues to step S610.

In step S610, color area detection module 130 may set a color detection threshold value, and operation of the process continues to step S612.

In step S612, color area detection module 130 may select a first/next pixel in the image, and operation of the process continues to step S614.

If, in step S614, color area detection module 130 determines that the image pixel is within the color detection threshold of the selected color, operation of the process continues to step S616, otherwise, operation of the process continues to step S618.

In step S616, color area detection module 130 may set the color map matrix element corresponding to the selected pixel to indicate that the selected color is present, e.g., to 1, assuming the matrix was initialized in step S608 to 0's, and operation of the process continues to step S618.

If, in step S618, color area detection module 130 determines that the last pixel in the page image is selected, operation of the process continues to step S702 of FIG. 7, otherwise, operation of the process continues to step S612.

In step S702, color area detection module 130 sets a threshold, e.g., based on a stored predetermined value, for an area considered to represent a significant color area, i.e., an area large enough for image quality defects over the area to be noticeable and/or objectionable to the human eye, is set, and operation of the process continues to step S704.

In step S704, color area detection module 130 may apply a morphological filter, such as a combination of open and close operations, on the 0/1 color map matrix to further select the structure of candidate contiguous areas, and operation of the process continues to step S706.

In step S706, color area detection module 130 may determine the contiguous areas of the page image that have the same or similar color to the currently selected color in the list based on the connectivity test applied to the filtered 0/1 color map matrix from S704 and then may calculate the average color of the pixels in those contiguous areas, and operation of the process continues to step S708.

In step S708, color area detection module 130 may store the average color of all contiguous areas and the numbers of contiguous pixels, i.e., the size/area, for each determined contiguous area in association with the currently selected color in the list, and operation of the process continues to step S712.

In step S712, color area detection module 130 may determine total weighted area for the selected color, as described in greater detail below, and operation of the process continues to step S714.

If, in step S714, color area detection module 130 determines that the total weighted area is greater than or equal to a predetermined significant weighted area, or area-weighted, threshold, operation of the process continues to step S718, otherwise, operation of the process continues to step S716.

In step S716, color area detection module 130 may discard stored information for colors determined not to meet or exceed the predetermined significant area-weighted threshold on the page, and operation of the process continues to step S718.

If, in step S718, color area detection module 130 determines that the last color of the set of K colors included in the page image, as identified for the page using, for example, the process described above with respect to FIG. 5, has not yet been selected, operation of the process continues to step S606 of FIG. 6, otherwise, operation of the process continues to step S720 and the process terminates.

As described in step S712, the total weighted area for the selected color may be determined using a tent-pole summation of factor $\alpha$ for summing multiple contiguous areas of an selected color, i. For example, the total weighted area for a color for a page may be determined using equation 1.

$$A_i = \text{largest area} + \alpha \times 2^{nd} \text{ largest area} + \alpha^2 \times 3^{rd} \text{ largest area} + \quad \text{Eq. 1}$$

Where $A_i$ is the total weighted area for the selected color on a page; and

The relative area sizes equal the number of contiguous pixels in each of the respective areas. The tent-pole summation factor $\alpha$ can have a value between 0 and 1, for example, $\alpha = 0.5$.

It is noted that image data may be received by a print defect management device as one or more dynamically typed concatenative programming language files, e.g., postscript or portable document format, or a similar programmed language. In such a case, the process described above with respect to FIG. 6 and FIG. 7 may be replaced by a process that scans the respective page descriptions in the image data for color and color area definitions and that generates a total weighted area, e.g., as described above with respect to equation 1, for each identified color in each page based on the extracted color and color area definitions. As described above with respect to FIG. 7 as steps S714 and S716, colors with a total weighted area less that a predetermined significant color area threshold may be discarded as not being a significant color in the page. Although in FIG. 6 a constant color detection threshold is set for the entire image, an adaptive threshold, which is based on local image data, may also be used.

Figure 8:
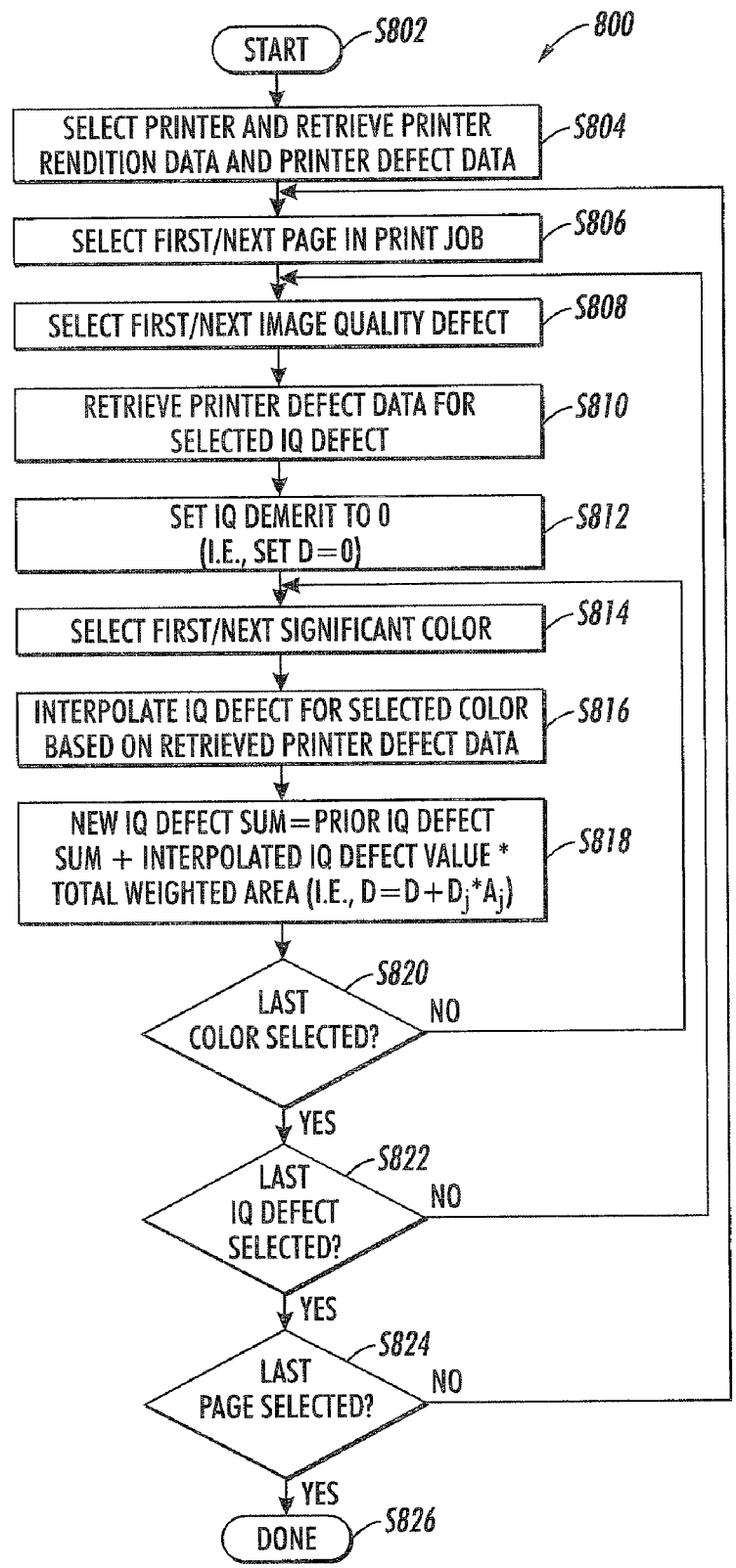
FIG. 8 is a flow diagram representing an example process by which an example image defect assessment module of the example print defect management device described with respect to FIG. 1, may assess the types of image quality defects and the severity of the respective image quality defects likely to occur within individual pages of a print job, if printed on a selected printer.

FIG. 8 is a flow diagram representing an example process 800 by which an example image defect assessment module 132 of the example print defect management processor described with respect to FIG. 1, may assess the types of image quality defects and the severity of the respective image quality defects likely to occur within individual pages of a print job, if printed on a selected printer. The process described with respect to FIG. 8 may be performed once for each selected printer per print job. For example, if a user wishes to evaluate the image quality for a print job if reproduced on five different printers, the process shown in FIG. 8 would need to be repeated once for each printer, or five times. However, steps S806 through S820 may be performed for a single page image for a single printer of interest, e.g., at the request of the image quality resolution module 136, to reassess the types of image quality defects and the severity of the respective image quality defects in a single page image that has been manually edited for a specific printer by the user e.g., using the image editing module 208 of the image quality defect resolution module 136, as described above with respect to FIG. 1 and FIG. 2, so that the image may be accurately re-rendered by image rendering module 204. As shown in FIG. 8, the described process begins at step S802 and proceeds to step S804.

In step S804, image defect assessment module 132 may select a printer and retrieve the printer defect data associated with the selected printer, and operation of the process continues to step S806.

In step S806, image defect assessment module 132 may select a first/next page from the current print job, and operation of the process continues to step S808.

In step S808, image defect assessment module 132 may select a first/next image defect associated with the selected printer by the printer's defect data, and operation of the process continues to step S810.

In step S810, image defect assessment module 132 may retrieve printer defect data for the selected image quality defect, and operation of the process continues to step S812.

In step S812, image defect assessment module 132 may initialize an area-weighted image quality defect sum to zero, and operation of the process continues to step S814.

In step S814, image defect assessment module 132 may select a first/next color, i.e., a color previously determined by color area detection module to have sufficient area for an image quality defect to be visible and/or objectionable to the human eye, and operation of the process continues to step S816.

In step S816, image defect assessment module 132 may interpolate a printer image quality defect value for the currently selected color, e.g., based on colors for which printer defect data is available, and operation of the process continues to step S818.

In step S818, image defect assessment module 132 may update the area-weighted image quality defect sum, as described in greater detail below, and operation of the process continues to step S820.

If, in step S820, image defect assessment module 132 determines that the last color has been selected, operation of the process continues to step S822, otherwise, operation of the process continues to step S814.

If, in step S822, image defect assessment module 132 determines that the last image quality defect affecting the currently selected printer has been selected, operation of the process continues to step S824, otherwise, operation of the process continues to step S808.

If, in step S824, image defect assessment module 132 determines that the last page of the print job has not been selected, operation of the process continues to step S806, otherwise, operation of the process continues to step S826 and terminates.

As described in step S818, image defect assessment module 132 may determine the area-weighted image quality defect sum using equation 2.

$$D = D_{Prior} + D_J * A_J \qquad \text{Eq. 2}$$

Where D is the cumulative area-weighted image quality defect sum;

$D_{Prior}$ is the previously determined image quality defect sum;

$D_J$ is the interpolated defect value produced in step S816; and $A_J$ is the total weighted area for the currently selected color.

Figure 9:
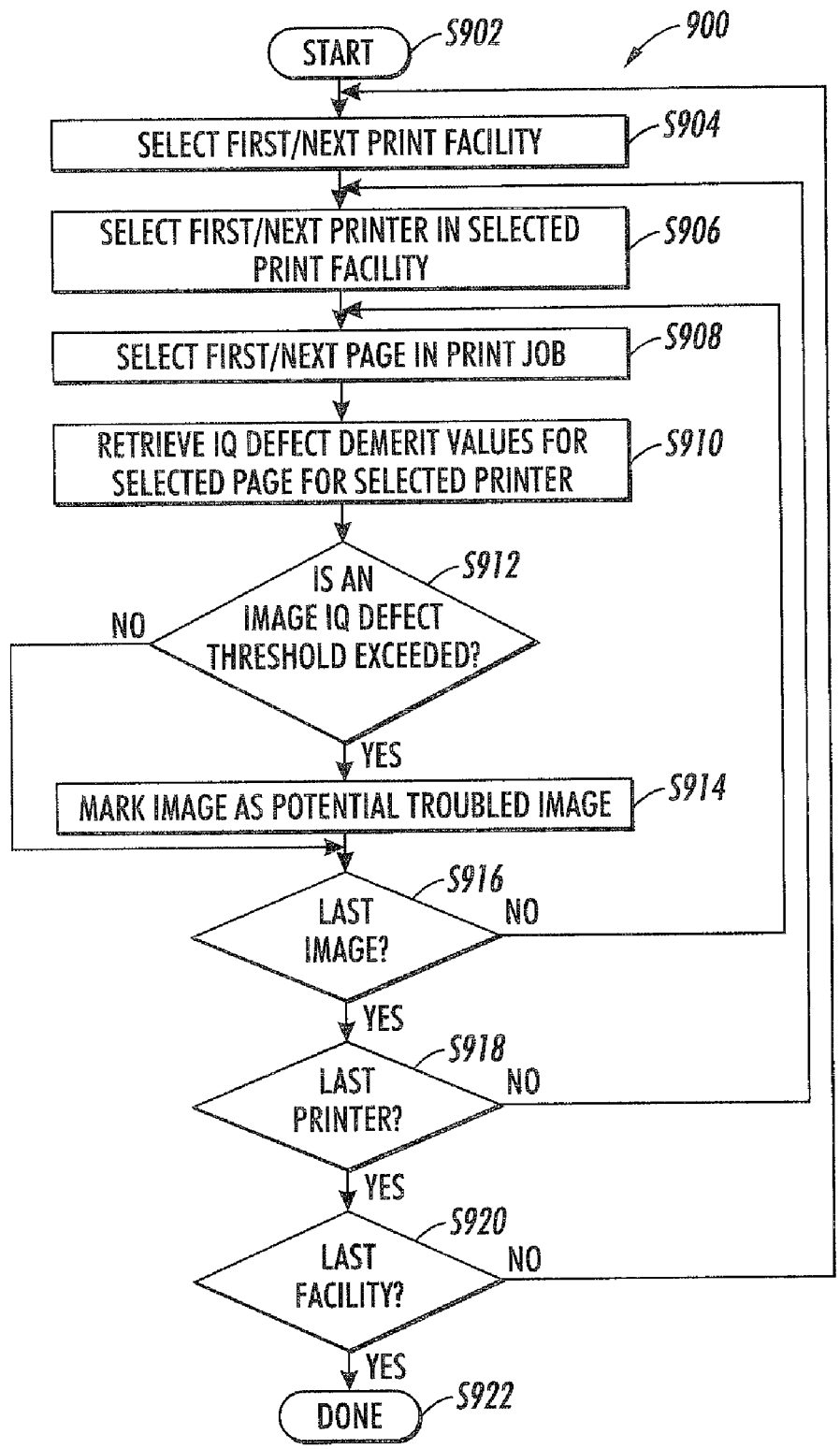
FIG. 9 is a flow diagram representing an example process by which an example identify troubled pages module of the example print defect management device described with respect to FIG. 1, may identify potential troubled page images within a print job, based on the image quality assessment process of FIG. 8 and predetermined threshold limits set for each type of image quality defect.

FIG. 9 is a flow diagram representing an example process 900 by which an example identify troubled pages module 134 of the example print defect management device 100 described with respect to FIG. 1, may identify potential troubled page images within a print job, based on the stored results of the image quality assessment process of FIG. 8 and predetermined threshold limits set for each type of image quality defect. The process described below identifies troubled pages in a print job for each print facility printer selected by the user as potential candidates for printing the selected print job. As shown in FIG. 9, the described process begins at step S902 and proceeds to step S904.

In step S904, identify troubled pages module 134 may select a first/next print facility selected by the user as potential candidates for printing the selected print job, and operation of the process continues to step S906.

In step S906, identify troubled pages module 134 may select a first/next printer at the selected print facility from the list of printers selected by the user as potential candidates for printing the selected print job, and operation of the process continues to step S908.

In step S908, identify troubled pages module 134 may select a first/next page in the print job, and operation of the process continues to step S910.

In step S910, identify troubled pages module 134 may retrieve a tea-weighted image quality defect sums generated, as described above with respect to FIG. 8, for the respective significant colors on the selected page for the selected printer, and operation of the process continues to step S912.

If, in step S912, identify troubled pages module 134 determines that at least one area-weighted image quality defect sum exceeds a threshold value for the respective type of image quality defect, operation of the process continues to step S914, otherwise, operation of the process continues to step S916.

In step S914, identify troubled pages module 134 may mark the current page as a troubled page with respect to the selected printer, and operation of the process continues to step S916.

If, in step S916, identify troubled pages module 134 determines that the last page has been selected, operation of the process continues to step S918, otherwise, operation of the process continues to step S908.

If, in step S918, identify troubled pages module 134 determines that the last printer has been selected, operation of the process continues to step S920, otherwise, operation of the process continues to step S906.

If in step S920, identify troubled pages module 134 determines that the last facility has been selected, operation of the process continues to step S904, otherwise, operation of the process continues to step S922 and terminates.

The process described above with respect to FIG. 9 may result in the identification of one or more pages in the print job being identified as suffering from image quality issues if printed by one or more printers in the list of printers under consideration by the user for printing the print job. Understandably, a page identified as having a first set of image quality defects, if printed by a first printer, may be identified as having a second set of image quality defects, or no image quality defects, if printed by a second printer. Although not shown in FIG. 9, the list of selected printers may be ranked based on the number and severity of troubled pages associated with each of the respective printers and may be presented to the user in such a ranked order via the user interface.

It is noted that, in step S910 of FIG. 9, the retrieved demerit values for the selected page for the selected printer may be generated in a manner other that described above with respect to FIG. 6 through FIG. 8. For example, the image quality demerit values for a selected page for a selected printer may be based of the output of a human visual model such as the structural similarity index (SSM). For example a SSIM may be used to visually compare a rendered image, that includes distortions based on a selected printer's rendition data and defect data, with a non-distorted version of the image, e.g., the original image, and may generate an assessment, i.e., image quality defect demerit values, of the human visible defects in the page.

Figure 10:
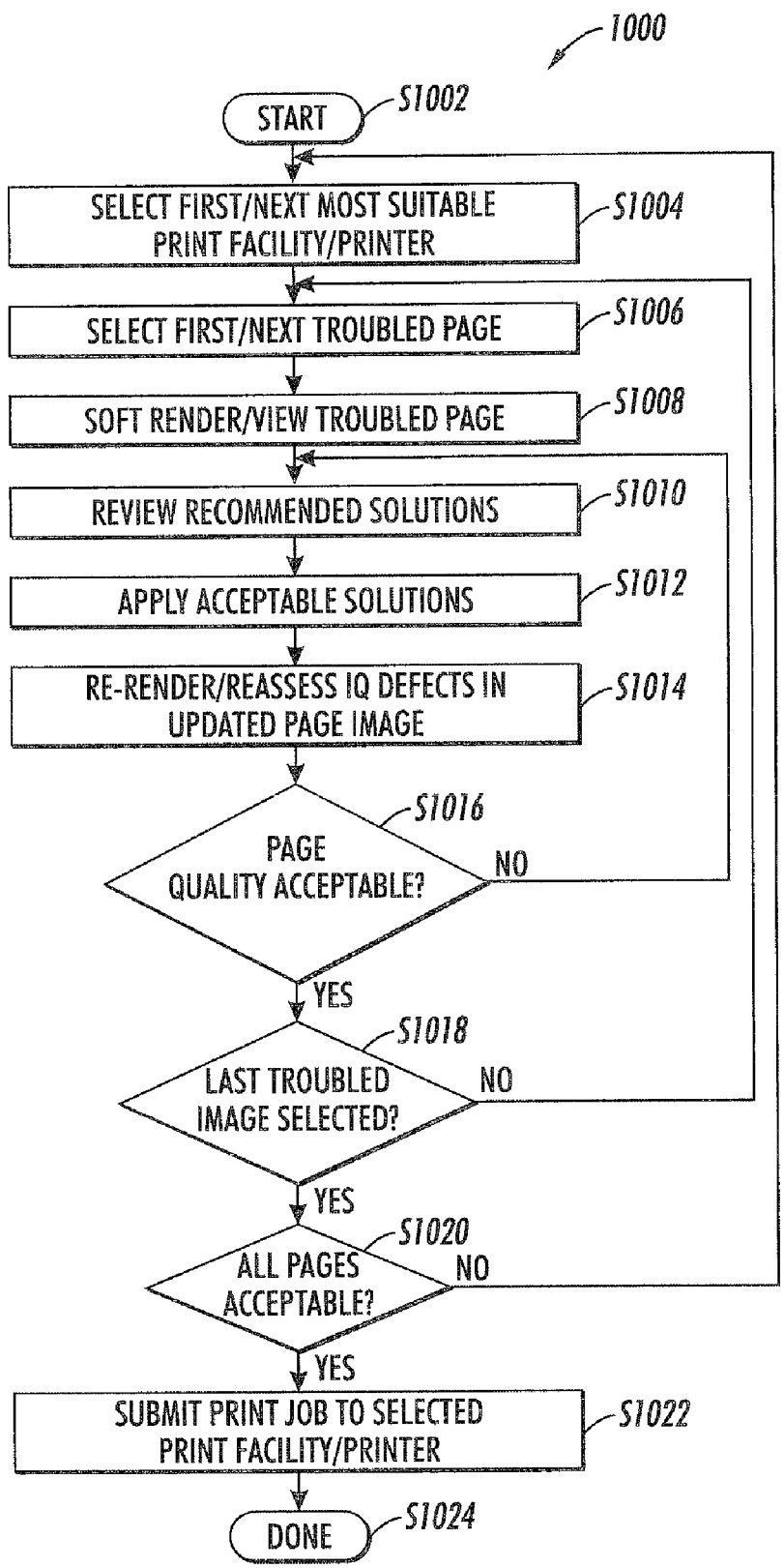
FIG. 10 is a flow diagram representing an example process by which an example image quality defect resolution module of the example print defect management device described with respect to FIG. 1, may be used to correct identified image quality defects within troubled images and to submit an image set that includes the corrected images to a print facility printer capable of generating hardcopy prints consistent with the approved image quality.

FIG. 10 is a flow diagram representing an example process 1000 by which an example image quality defect resolution module 136 of the example print defect management processor described with respect to FIG. 1, may be used to view and/or correct identified image quality defects within troubled images and to submit a print job that may or may not include corrected page images to a print facility printer capable of generating hardcopy prints consistent with the image quality approved by the user. As shown in FIG. 10, the described process begins at step S1002 and proceeds to step S1004.

In step S1004, a user may select, via the user interface provided by user interface module 126 for image quality defect resolution module 136, a first/next most suitable printer, and operation of the process continues to step S1006. Suitability may be determined via the cost function, as described above.

In step S1006, the user may select a first/next troubled page image, and operation of the process continues to step S1008.

In step S1008, the user may select to view a rendered image of the selected page produced by image rendering module 204, and operation of the process continues to step S1010.

In step S1010, the user may view a list of recommended solutions generated by resolution suggestion module 206, and operation of the process continues to step S1012.

In step S1012, the user may select to apply a recommended solution suggested by resolution suggestion module 206 to improve the image quality on the selected printer, and operation of the process continues to step S1014.

In step S1014, the user select to view a re-rendered version of the modified troubled page, and operation of the process continues to step S1016.

Ifs in step S1016, the user determines that the page image quality is sufficient or acceptable, operation of the process continues to step S1018, otherwise, operation of the process continues to step S1010.

If, in step S1018, the user determines that no further troubled pages need be reviewed, operation of the process continues to step S1020, otherwise, operation of the process continues to step S1006.

If in step S1020, the user determines that all the pages in the print job have an acceptable image quality, operation of the process continues to step S1022, otherwise, operation of the process continues to step S1004.

In step S1022, the user may, via print job submission module 140, select a printer to which the user may submit the print job, and operation of the process continues to step S1024 and terminates.

Experiments using an example embodiment of the above described print defect management device has demonstrated that the above described job-specific print defect management approach can be used to automatically identify pages in a print job that are likely to include image defects visible and/or objectionable to the human eye, upon being printed by a printer with known color rendition data and a known set of previously recorded print defects. For example, by identifying colors within an page that have a total contiguous area above a predetermined minimum, e.g., 0.01%, the approach is able to determine whether known printer defects with respect to a color identified in a page image is likely to be visible and/or objectionable to the human eye, and thus is able to avoid false positives with respect to identifying troubled pages in a print job.

Figure 11:
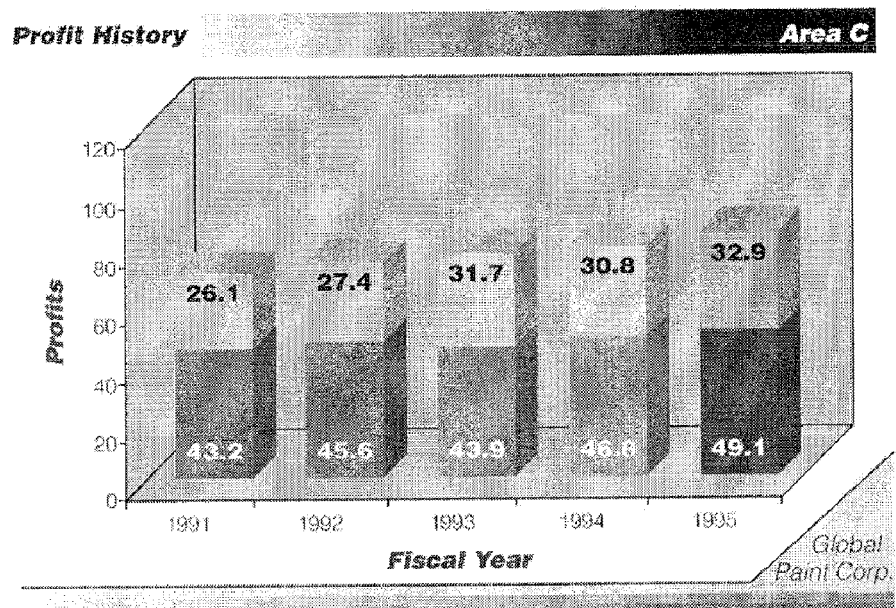
FIG. 11 is a first original page image.
Figure 12:
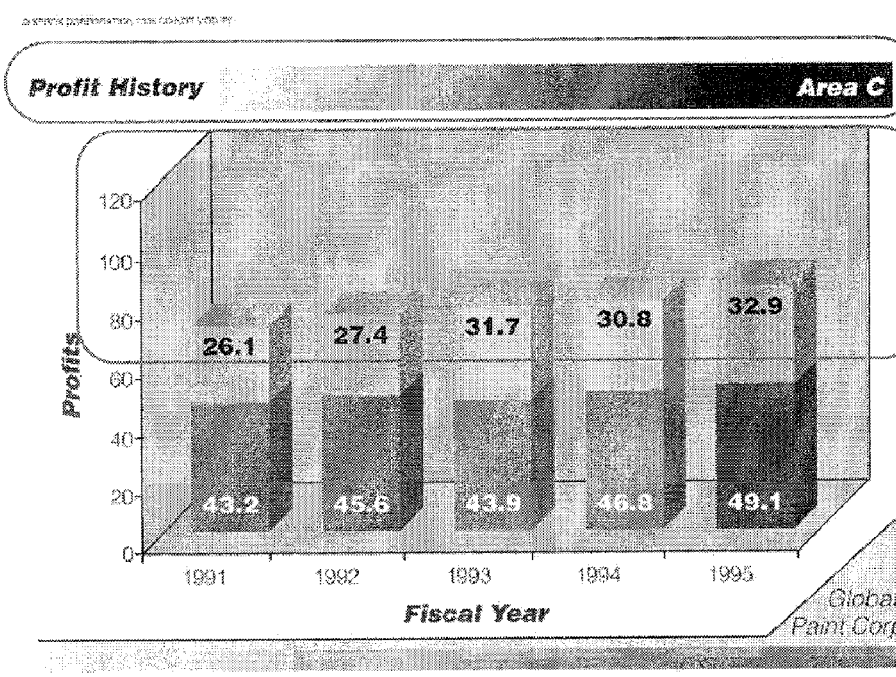
FIG. 12 is a rendered representation of the original page presented in FIG. 11 as the image is expected to be printed on a selected printer, the original page determined to have an area-weighted mottle score=69.3.

For example, FIG. 11 shows a first original page image that includes large contiguous areas of black and large contiguous areas of gray. FIG. 12 is a rendered representation of the first original page image as the image is expected to appear if printed on a printer with known color rendition data and known mottle image quality print defects in the black and gray colors. The rendered image is based on processing performed by an experimental print defect management device that implements the functions described above with respect to color detection module 128, color area detection module 130 and image defect assessment module 132. The image defect assessment module 132 determined that the page image would have an area-weighted mottle score of 69.3, if printed on the selected printer, indicating that the visibly detectable and/or objectionable effect of the mottle to the human eye is expected to be high. In an example print defect management device that supports job-specific print defect management, a threshold for the mottle defect may be set sufficiently low so that the identify troubled pages module 134 would identify such a page as a troubled page that may be rendered and viewed by the user, e.g., using an example embodiment of image quality defect resolution module 136, as described above, to resolve such image quality defects to the satisfaction of the user prior to printing.

Figure 13:
FIG. 13 is a second original page image.
Figure 14:
FIG. 14 is a rendered representation of the second original page image presented in FIG. 13 as the image is expected to be printed on a selected printer, the original page determined to have an area-weighted mottle score=5.3.

By way of a second example, FIG. 13 shows a second original page image that includes areas of red, green, brown and yellow, but has no significant large contiguous areas of any color. FIG. 14 is a rendered representation of the first original page image as the image is expected to appear if printed on a printer with known color rendition data and known mottle image quality print defects in the red, green, brown and yellow colors. The rendered image is based on processing performed by an experimental print defect management device that implements the functions described above with respect to color detection module 128, color area detection module 130 and image defect assessment module 132. The image defect assessment module 132 determined that the page image would have an area-weighted mottle score of 5.3, if printed on the selected printer, indicating that the visibly detectable and/or objectionable effect of the mottle to the human eye is expected to be low. In an example print defect management device that supports job-specific print defect management, a threshold for the mottle defect may be set sufficiently high so that the identify troubled pages module 134 would not identify such a page as a troubled page prior to printing.

Figure 15:
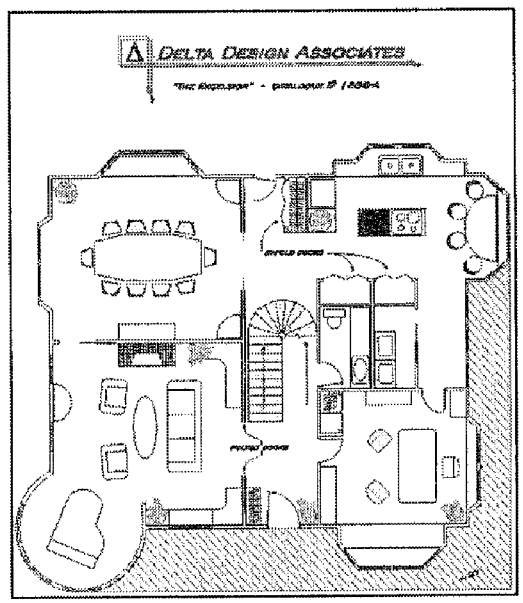
FIG. 15 is a third original page image.
Figure 16:
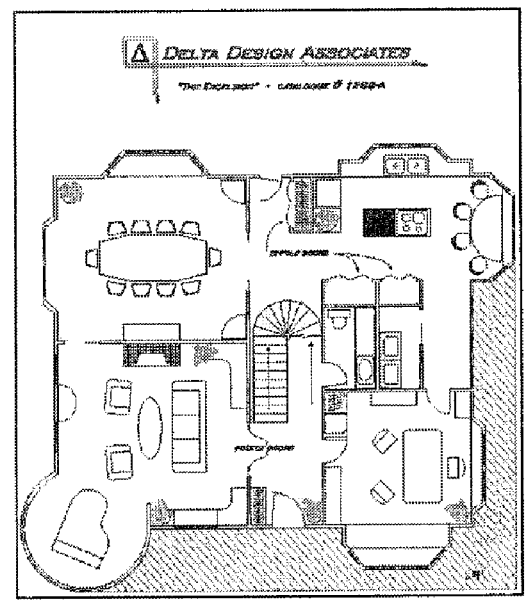
FIG. 16 is a rendered representation of the third original page image presented in FIG. 13 as the image is expected to be printed on a selected printer, the original page determined to have an area-weighted mottle score=0.2.

By way of a third example, FIG. 15 shows a third original page image that includes areas of red, black, green and blue, but has no significant large contiguous areas of any color. FIG. 16 is a rendered representation of the first original page image as the image is expected to appear if printed on a printer with known color rendition data and known mottle image quality print defects in the red, black, green and blue colors. The rendered image is based on processing performed by an experimental print defect management device that implements the functions described above with respect to color detection module 128, color area detection module 130 and image defect assessment module 132. The image defect assessment module 132 determined that the page image would have an area-weighted mottle score of 0.2, if printed on the selected printer, indicating that the visibly detectable and/or objectionable effect of the mottle to the human eye is expected to be extremely low. In an example print defect management device that supports job-specific print defect management, a threshold for the mottle defect may be set sufficiently high so that the identify troubled pages module 134 would not identify such a page as a troubled page prior to printing.

It is to be understood that the various functions that support the described print defect management device in support of job-specific print defect management may be distributed in any manner among any quantity (e.g., one or more) of hardware and/or software modules or units that may be interconnected with circuitry and/or software interfaces.

The functions that support the described print defect management device in support of job-specific print defect management may include any commercially available operating system (e.g., Windows, OS/2, Unix, Linux, DOS, etc.), any commercially available and/or custom software (e.g., communication software, etc.) and any types of input/output devices (e.g., keyboard, mouse, probes, I/O port, etc.).

Software, or firmware, that support the described print defect management device in support of job-specific print defect management may be implemented in any desired computer language, and may be developed by one of ordinary skill in the computer and/or programming arts based on the functional description contained herein and illustrated in the drawings. For example, in one example of an embodiment the described device may be written using the C++ programming language or the JAVA programming language. However, the present invention is not limited to being implemented in any specific programming language or combination of programming languages.

Any software associated with the described print defect management device in support of job-specific print defect management may be distributed via any suitable media (e.g., removable memory cards, CD-ROM, tape or other storage media diskette, ad-hoc network connection). Software and/or default control parameters may be installed in any manner (e.g., an install program, copying files, entering an execute command, etc.).

The described print defect management device may accommodate any quantity and any type of data sets in any desired format (e.g., ASCII, plain text, or other format, etc.). The format and structure of internal information structures used to hold intermediate information in support of the described job-specific print defect management approach may include, but are not limited to files, arrays, matrices, status and control booleans/variables.

Further, any references herein to software performing various functions generally refer to computer systems or processors performing those functions under software control. The computer system may alternatively be implemented by hardware or other processing circuitry.

From the foregoing description, it will be appreciated that a print defect management device that supports job-specific print defect management is disclosed. The described print defect management device and processes for performing job-specific print defect management improve the integrity of print jobs by allowing defects to be detected and corrected based on an analysis of the page images to be printed that includes the color rendition data and print defects associated with a selected printer to allow detection and correction of print quality defects that would otherwise be undetectable prior to printing.

For purposes of explanation, in the above description, numerous specific details are set forth in order to provide a thorough understanding of the described print defect management device that supports job-specific print defect management. It will be apparent, however, to one skilled in the art that the described print defect management device that supports job-specific print defect management may be practiced without these specific details. In other instances, well-known structures and devices are shown in block diagram form in order to avoid obscuring the features of the described print defect management device that supports job-specific print defect management.

It will be appreciated that various of the above-disclosed and other features and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A print defect management device comprising:
   a print defect management controller that receives printer color rendition data and printer defect data for a selected printer, the image defect management controller further receiving page image data;
   an image defect assessment module that generates a measure of image defect based on the page image data, printer color rendition data for the selected printer and printer defect data for the selected printer; and
   an image quality defect resolution module that displays a rendered view of page image data expected to contain image defects that exceed an allowed image defect threshold,
   wherein the image quality defect resolution module further comprises a resolution suggestion module that generates suggested changes to the page image data to improve expected image defects, the suggested changes comprising a list of a plurality of alternatives for improving or eliminating the expected image defects.

2. The device of claim 1, wherein the image defect assessment module operates on the page image data on a page by page basis.

3. The device of claim 2, further comprising:
   a troubled page identifying module that determines whether a printed page generated by the selected printer is expected to contain image defects that exceed the allowed image defect threshold based on the measure of image defect generated by the image defect assessment unit.

4. The device of claim 1, wherein the image quality defect resolution module renders the page image data according to the printer color rendition data and the printer defect data of the selected printer to produce a rendered image data and compares the rendered image data with the page image data via a human visual system model to generate the measure of image defect.

5. The print defect management device of claim 1, further comprising:
   a color detection module that identifies colors in the page image data;
   a color area detection module that determines an area associated with a color identified in the page image data,
   wherein the image defect assessment module generates a measure of image defect only for a color with an area greater than a predetermined color area threshold.

6. The print defect management device of claim 1, wherein the image quality defect resolution module further comprises:
   an image editing module that allows a user to apply the suggested change to the page image data.

7. The print defect management device of claim 1, further comprising:
   a network interface that allows the print defect management device to access printer color rendition data and printer defect data for the selected printer over a network.

8. The print defect management device of claim 7 wherein the network is a local area network.

9. The print defect management device of claim 7 wherein the network is one of a wide area network and the Internet.

10. The print defect management device of claim 7, further comprising:
    a printer selection module that allows a user to select one or more network printers accessible via the network interface.

11. The print defect management device of claim 7, further comprising:
    a print job submission module that allows a user to submit the page image data to the selected printer over the network.

12. A non-transitory computer-readable storage medium storing a method of performing job-specific print defect management, the method comprising:
    receiving printer color rendition data and printer defect data for a selected printer;
    receiving page image data;
    generating measures of image defect based on the page image data, printer color rendition data for the selected printer and printer defect data for the selected printer;
    displaying a rendered view of page image data expected to contain image defects that exceed an allowed image defect threshold; and
    generating suggested changes to the page image data to improve expected image defects, the suggested changes comprising a list of a plurality of alternatives for improving or eliminating the expected image defects.

13. The non-transitory computer-readable storage medium storing the method of claim 12, wherein the measures of image defect are generated on a page by page basis.

14. The non-transitory computer-readable storage medium storing the method of claim 13, the method further comprising:
   determining whether a printed page generated by the selected printer is expected to contain image defects that exceed an allowed image defect threshold based on the measures of image defect.

15. The non-transitory computer-readable storage medium storing the method of claim 12, the method further comprising:
   rendering the page image data according to the printer color rendition data and the printer defect data of the selected printer to produce a rendered image data; and
   comparing the rendered image data with the page image data via a human visual system model to generate the measures of image defect.

16. The non-transitory computer-readable storage medium storing the method of claim 12, the method further comprising:
   identifying colors in the page image data;
   determining an area associated with each color identified in the page image data,
   wherein measures of image defect are generated only for a color with an area greater than a predetermined color area threshold.

17. The non-transitory computer-readable storage medium storing the method of claim 12, the method further comprising:
   selecting one or more network printers accessible via a network;
   accessing printer color rendition data and printer defect data for the selected printer over the network.

18. The non-transitory computer-readable storage medium storing the method of claim 17, the method further comprising:
   submitting the page image data to the selected printer over the network.

19. The non-transitory computer-readable storage medium storing the method of claim 12, the method further comprising:
   generating a rendered view of page image data expected to contain image defects that exceed the allowed image defect threshold;
   generating a suggested change to the page image data to improve expected image defects;
   applying the suggested change to the page image data based on an approval from a user.

* * * * *